UNITED STATES PATENT OFFICE.

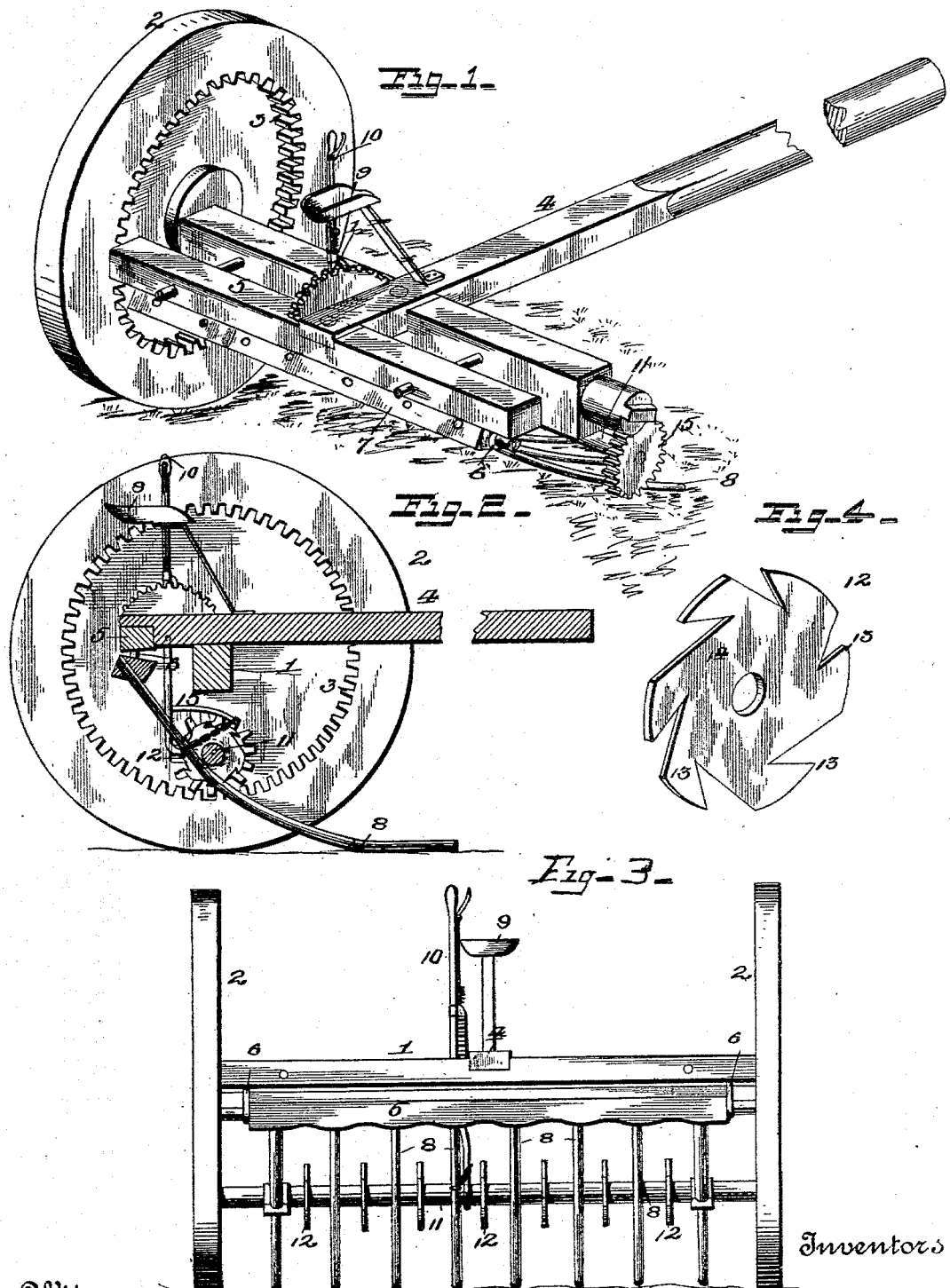

MARK P. KELLY AND CHARLES HOLLOWAY, OF HEALDSBURG, CALIFORNIA.

BRUSH-CUTTING MACHINE.

SPECIFICATION forming part of Letters Patent No. 515,866, dated March 6, 1894.

Application filed November 10, 1893. Serial No. 490,529. (No model.)

*To all whom it may concern:*

Be it known that we, MARK P. KELLY and CHARLES HOLLOWAY, citizens of the United States, and residents of Healdsburg, in the county of Sonoma and State of California, have invented certain new and useful Improvements in Brush-Cutting Machines; and we do hereby declare the following to be a full, clear, and exact description of the invention, such as will enable others skilled in the art to which it appertains to make and use the same.

This invention relates to brush cutting machines, and has for its object to simplify the construction and arrangement of such devices, and render the same more positive in their action, by mechanism which is comparatively inexpensive.

With these and other objects in view, the invention consists of the construction and arrangement, of the several parts which will be more fully hereinafter described and claimed.

In the drawings: Figure 1 is a perspective view of the improved brush cutting machine, showing one of the wheels removed. Fig. 2 is a central longitudinal section. Fig. 3 is an end elevation of the machine. Fig. 4 is a detail perspective view of one of the knives.

Similar numerals of reference are employed to indicate corresponding parts in the several views.

Referring to the drawings, the numeral 1 designates an axle beam on the ends of which are journaled a pair of ground or traction wheels 2, supplied with annular gear teeth 3. Connected to the axle beam is a pole or tongue 4 which is extended in rear of said axle beam and connected to the supplemental beam 5, having suspended therefrom by hinges 6, a rake head 7 carrying a series of rake teeth 8, which extend forwardly in curved lines under the axle beam as fully shown. Suitably secured to the pole or tongue 4, is a driver seat 9, and adjacent thereto is a lever 10 which is extended downwardly and secured to a bar 11 on which is mounted a series of rotating knives 12, mounted between the teeth 8 of the rake. The teeth of the rake will be so arranged as to barely leave room for the passage of the knives and of such width as to leave the knives one inch apart. The knives 12, will be formed with a series of peripheral teeth 13, as shown by Fig. 4, and enlarged at their centers as at 14. On opposite ends of the bar 11, are pinions 15, which are adapted to mesh with the gear teeth 3, of the wheels 2, and in operation, the lever is actuated or adjusted to raise the pinions from mesh with the teeth 3, and at the same time elevate the knives and rake teeth, as said parts are all connected for simultaneous adjustment.

It will be understood that the machine will be made in different sizes to serve different purposes, and the materials employed in the construction of the several parts will be of such nature as found best adapted for the purpose.

It is obviously apparent that many minor changes in the construction and arrangement of the several parts might be made and substituted for those shown and described so long as they are within the scope of the invention, without departing from the nature or spirit of the latter.

Having thus described the invention, what is claimed as new is—

In a brush cutting machine, the combination of an axle beam having wheels mounted thereon with annular gear teeth therein, a supplemental beam attached to the axle beam, a rake head hinged to said supplemental beam, and having forwardly projecting curved rake teeth and a rotating bar having pinions at the opposite ends thereof, meshing with the annular teeth of the wheels, and provided with a series of rotating cutters, between which the said rake teeth pass, said parts being simultaneously adjustable, substantially as described.

In testimony whereof we have signed this specification in the presence of two subscribing witnesses.

MARK P. KELLY.
CHARLES HOLLOWAY.

Witnesses:
C. H. POND,
ANDREW PRICE.